United States Patent Office 2,782,404
Patented Feb. 19, 1957

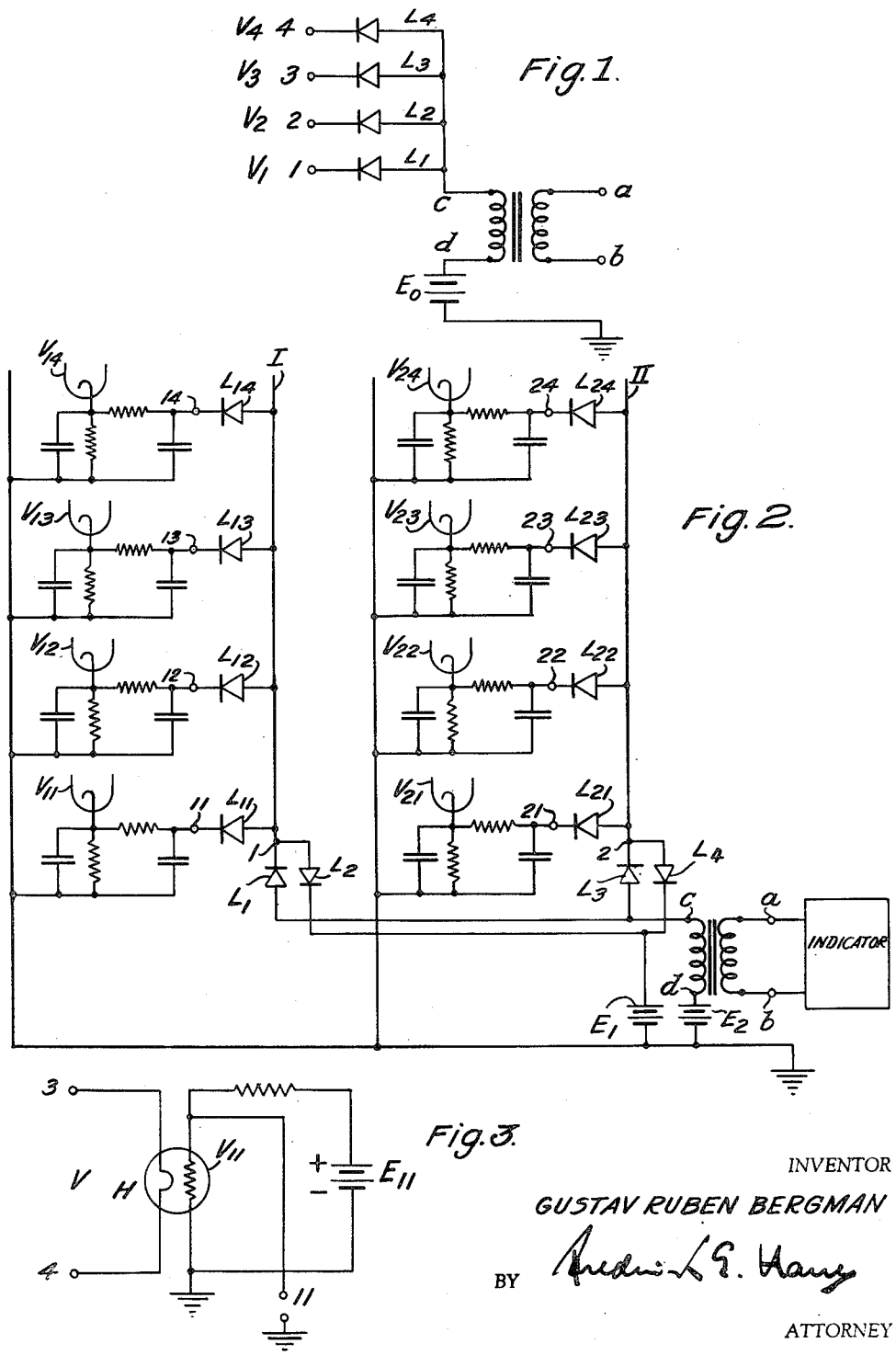

2,782,404

CIRCUIT CONTROL SYSTEM FOR SUPERVISING THE OPERATION OF A PLURALITY OF DEVICES

Gustav Ruben Bergman, Hagersten, Sweden, assignor to Telefonaktiebolaget L M Ericsson, Stockholm, Sweden, a corporation of Sweden Application July 21, 1954, Serial No. 444,891

Claims priority, application Sweden August 7, 1953

4 Claims. (Cl. 340—253)

The present invention refers to a circuit control system for signalling abnormal functioning of one or several apparatus within a group of apparatus of the kind described in British Patent 749,442. The system according to the patent comprises an indicating means for testing the changes of the alternating current impedance between the test conductors to which every apparatus within the group has connected a control means, the impedance of said control means varying continuously depending on the current- or voltage-condition of the corresponding apparatus. The impedance of every control means within such a system is arranged to experience a large change, when the current- or voltage-condition of the corresponding apparatus passes the limits set for the allowed working deviation of said apparatus. The system is such that the impedance change of the control means at abnormal function of a certain apparatus is considerably greater than the combined impedance change in the other control means of apparatuses operation with the allowed operational deviations.

The object of the invention is to improve a certain embodiment of the proposed apparatus, in which the control means comprise rectifiers actuated by a direct current bias, which is to be controlled, whereby small changes in said voltage cause a sudden change of the alternating current resistance of the rectifiers.

The control system according to the invention is mainly characterized by the individual rectifiers of the supervising apparatus being combined to form groups, each one of which is, over a rectifier and a quadripole coupled to the indicating means, connected to one of the poles of a voltage source producing a reference voltage and, over a second rectifier, connected directly to the corresponding pole of a second voltage source, the second pole of said two voltage sources seen from an alternating current point of view being grounded, the invention being also characterized by the individual rectifiers and the first common rectifier having the same pass direction, while the second common rectifier has the opposite pass direction in relation to said rectifiers, and the reference voltage and the control voltages taken out from the several apparatus being such, that normally, i. e. when none of the apparatus is defective, no current in the pass direction flows through the individual rectifiers and the first common rectifier, the voltage which comes from the second voltage source being such, that normally the currents in the blocking direction of the individual rectifiers flow in the pass direction of the second common rectifier, said currents thus being unable to actuate the indicating means.

The invention will be more closely described in detail in connection with the enclosed drawing, in which Fig. 1 shows a circuit diagram of a control system according to the invention. Fig. 2 shows a circuit diagram of a control system according to the invention for the control of direct voltages. Fig. 3 shows a part of a control system, for controlling alternating and direct voltages.

The control system according to the invention is based on the principle that the apparatus, which are to be controlled, actuate, through a direct voltage taken out from these apparatus, the alternating current impedance of a control means connected in its turn to an indicating means.

In Fig. 1, showing a circuit diagram of the control means included in the supervising device, $V_1$, $V_2$, $V_3$ and $V_4$ represent the direct voltages taken out from the supervising apparatuses not shown on the figure. The points 1—4, at which said voltages are taken out, are connected over individual rectifiers $L_1$—$L_4$ to a reference or counter voltage $E_0$, said voltage blocking the rectifiers $L_1$—$L_4$ when the apparatuses work normally.

The arrangement operates for instance in the following manner when there is a fault in the apparatus connected to point 1: The voltage $V_1$ in said point decreases below the value $E_0$ and therefore the resistance in the rectifier $L_1$ is very small, compared with the resistance before the fault appeared. If the points 1—4 from an alternating current point of view are grounded, the impedance between the output terminals $a$—$b$ of a transformer, which was high before the fault, will now be low, the input terminals $c$—$d$ of said transformer being connected in series to the voltage source of the reference voltage $E_0$ and the points 1—4. This impedance change actuates an indicating means, not shown in the figure, but connected to the output terminals $a$—$b$.

The arrangement, in which indication is wanted, when any of the voltages $V_1$—$V_4$ decrreases under a certain value, has been described above. If the polarities of the rectifiers $L_1$—$L_4$ are changed and the value of the reference voltage $E_0$ is changed, an impedance reduction will be obtained over the terminals $a$—$b$, when any of the voltages $V_1$—$V_4$ increases to a certain value.

A control system of the kind herein referred to, is especially useful for all automatic indication of the decrease of the anode current in electron tubes under a certain limit, the rejection limit. It is of the greatest importance that the control means are so arranged, that the greatest possible number of tubes can be connected to the same indicating means, as the number of tubes within a plant of this kind, for instance a station for carrier frequency telephony, can be very great. Besides this it is important to have as small dimensions of the control means as possible.

Since the indicating means measures the changes of the alternating current impedance, it is possible, as appears from Fig. 1, to dispense with a direct conductive connection between the control rectifiers $L_1$—$L_4$ and the indicating circuit by providing a transformer. The indicating circuit may thus become common to several groups of control rectifiers of the kind shown in Fig. 1. As a result the same indicating means can be used for control of as well voltage increases as voltage decreases in relation to several different reference voltages $E_0$. It is naturally possible to connect an alarm device responsive to positive deviations and an alarm device responsive to negative deviations to the same measuring point 1—4.

If the rectifiers were of ideal quality it would be possible to connect an infinite number of measuring points to the control means according to Fig. 1. The number of connected apparatus is, however, fixed in practice by the relation between the impedances in the normal case, i. e. the back resistances, connected in parallel, of all the rectifiers, and the impedance when a fault appears, i. e. the advance resistance of one rectifier. This relation must be at least 5:1, if the indication is to be certain. In practice a device according to Fig. 1 can supervise maximally fifty apparatus with crystal rectifiers of normal quality.

The control means according to Fig. 2 can supervise a much greater number of apparatus using one and the same indicating means. As can be seen from the circuit diagram the measuring points are arranged in groups, for example two groups I and II, one of which includes the measuring points 11—14 and the other the measuring points 21—24. $E_2$ represents the reference voltage and the supervising voltages, $V_{11}$—$V_{14}$, $V_{21}$—$V_{24}$, are normally higher than voltage $E_2$. The total current in the blocking direction from the rectifiers $L_{11}$—$L_{14}$ resp. $L_{21}$—$L_{24}$ flows normally through the rectifier $L_2$ resp. $L_4$ to a voltage source, the voltage $E_1$ of which is equal or a little higher than $E_2$. These currents in the blocking direction thus by-pass the primary winding $c$—$d$ of the transformer and are evidently not able to actuate the indicating means. (The voltage sources, producing the voltages $E_1$ and $E_2$, may be in form of a single voltage source.) The rectifiers $L_1$ and $L_3$ are in this case normally blocked, the impedance between the output terminals $a$—$b$ of the transformer, connected to the indicating means, thus being normally high, i. e. when no fault exists at the points 11—14 and 21—24. At the same time the impedance between ground and the points 1 and 2, where the rectifiers $L_1$, $L_2$ and $L_3$, $L_4$, belonging to the groups I and II, respectively, are connected to each other, obtains a low value. The crosstalk attenuation between the different points 11—14, 21—24 will then be kept high, so that a signal in any of these points cannot be transmitted to the other measuring points.

In case of a fault, for instance in the point 11, the rectifiers $L_{11}$ and $L_1$ become conducting, the control voltage $V_{11}$ in this point now decreasing below the reference voltage $E_2$. The impedance over the output terminals $a$—$b$ will then be low, so that the indicating means is actuated.

By changing the values of the voltages $E_1$ and $E_2$ and changing the polarity of all the rectifiers it is possible to obtain a low impedance between the terminals $a$—$b$, when the control voltages $V_{11}$—$V_{14}$, $V_{21}$—$V_{24}$ increase above the value of the voltage $E_2$, instead of at a decrease as mentioned before.

The transformer $a$—$b$—$c$—$d$ can suitably be tuned to the frequency of the indicating means thus being more easily constructed.

It is previously assumed that a direct voltage from the supervising apparatus controls the rectifiers. If instead an alternating voltage of suitable value is used, this alternating voltage can be rectified and supplied to the measuring points in a control means, constructed in accordance with the above described embodiments.

Fig. 3 shows a part of a control means for supervising an alternating voltage. The supervising alternating voltage V is supplied to the heater in a thermistor H via the terminals 3—4. The measuring point is represented by 11 and the wanted direct voltage $V_{11}$ is taken out between this point and ground and supplied to a rectifying device, for instance $L_{11}$, $L_1$, $L_2$, etc. according to Fig. 2. $E_{11}$ represents a local source for the circuit in Fig. 3.

An alteration of the alternating voltage V (or possibly a direct voltage) over the heater changes the resistance in the thermistor element and therewith also the potential over this element. Thus the control voltage $V_{11}$ is changed. If the supervising voltage V reaches a predetermined value the sequence described in connection with Fig. 2 is repeated, the potential $V_{11}$ then (by use of a thermistor H with a negative temperature coefficient) decreasing and current flowing through the rectifier $L_1$ in its pass direction.

By use of the illustrated thermistor device the variations of the voltage V will cause much greater variations in the voltage $V_{11}$. Thus the described device is also suitable when using direct voltage with small variations, said variations being amplified to much greater variations in the direct voltage $V_{11}$, which is supplied to the measuring points.

The invention may naturally be modified in several ways within the scope of the claims.

I claim:

1. In a circuit control system for supervising the operation of a plurality of devices formed into at least two groups each including at least two devices each having an operating voltage of a predetermined normal magnitude, a rectifier individual to and connected with each device, a first common rectifier individual to each of said groups and having one terminal connected to one terminal of each rectifier within its group, a first reference D.-C. voltage source common to both groups and having one terminal connected to the other terminals of said first common rectifiers, a second common rectifier individual to each of said groups having one terminal connected to said one terminal of each rectifier within its group, a second source of D.-C. voltage having one terminal connected to the other terminals of said second common rectifiers, connections between the other terminals of said voltage sources and ground, said individual rectifiers and said first common rectifiers being all conducting in the same direction and said second common rectifiers being conducting in the opposite direction, said first voltage source and the voltages of said devices applied to the other terminals of said individual rectifiers having a magnitude such that current will not flow through the individual rectifiers and the first common rectifiers when all devices are operating normally, and said second voltage source having a voltage such that current will flow in the conducting direction of the second common rectifiers but of a magnitude below said predetermined normal value when all said devices are operating normally, and indicating means responsive to changes in magnitudes of said currents in said common rectifiers.

2. A circuit according to claim 1, wherein said indicating means includes a transformer having a primary and secondary and said primary is connected in series with said first source of voltage.

3. A circuit control system according to claim 1, wherein first and second voltage sources are of equal magnitude with like terminals grounded.

4. A circuit system according to claim 1 further including thermistor means individual to each device and having a heater energized by the operating voltage thereof, and a source of voltage connected with said thermistors and their associated individual rectifiers, said thermistors modifying the voltages applied to their respective individual rectifiers in accordance with changes in the operating voltages of the respective devices.

References Cited in the file of this patent

UNITED STATES PATENTS 2,547,011   Jacobsen _____ Apr. 3, 1951